United States Patent [19]

Matthews

[11] 4,044,622
[45] Aug. 30, 1977

[54] ANTI-EJECTION SYSTEM FOR CONTROL ROD DRIVES

[76] Inventor: John C. Matthews, 516 E. Allen St., Lancaster, Ohio 43130

[21] Appl. No.: 550,250

[22] Filed: Feb. 18, 1975

[51] Int. Cl.² ............................................. F16H 1/18
[52] U.S. Cl. ............................ 74/424.8 R; 74/424.8 C
[58] Field of Search ................... 74/424.8 C, 424.8 R, 74/89.15

[56] References Cited

U.S. PATENT DOCUMENTS

| | | | |
|---|---|---|---|
| 3,053,104 | 9/1962 | Scavini | 74/424.8 R |
| 3,079,323 | 2/1963 | Hawke | 74/424.8 R |
| 3,583,254 | 6/1971 | Winders | 74/424.8 R |
| 3,822,439 | 7/1974 | Wallin et al. | 74/424.8 R |
| 3,861,221 | 1/1975 | Stanley | 74/424.8 R X |

Primary Examiner—Leonard H. Gerin

[57] ABSTRACT

A linearly movable latch mechanism is provided to move into engagement with a deformable collet whenever an undesired ejection of a leadscrew is initiated from a nuclear reactor mounted control rod drive. Such an undesired ejection would occur in the event of a rupture in a housing of the control rod drive. The collet is deformed by the linear movement of the latch mechanism to wedge itself against the leadscrew and prevent the ejection of the leadscrew from the housing. The latch mechanism is made to be controllably engageable with the leadscrew and when thus engaged to allow the leadscrew to move in a control direction while moving with the leadscrew to engage and deform the collet when the leadscrew moves in an ejection direction.

13 Claims, 2 Drawing Figures

ANTI-EJECTION SYSTEM FOR CONTROL ROD DRIVES

The invention described herein was made in the course of or under Contract No. 2-36216 with the Maritime Administration of the Department of Commerce. The Government is licensed under, and on the performance of a condition precedent specified in the contract, shall acquire the entire right, title and interest in this Application and any resulting patent.

BACKGROUND OF THE INVENTION

1. Field of the Invention

The present invention relates generally to control rod drives for nuclear reactors and particularly to mechanisms for preventing an undesired ejection of the leadscrew of the control rod drive.

2. Description of the Prior Art

Control rod drives for nuclear reactors comprise sealed pressure vessels which are sealably mounted to the nuclear reactor to connect the control rods of the reactor and to allow the controlled positioning of the rods within the reactor. As such the housing containing the drive mechanism is maintained at the same pressure as the nuclear reactor. Should the housing of the control rod drive rupture, the leadscrew of the drive mechanism along with the control rod connected thereto could be ejected from the housing by the pressure difference created between the housing and the ambient.

Known prior art control rod drives depend upon the engagement of the driving element with the leadscrew to prevent the leadscrew from being ejected. However, certain situations are encountered where it is desirable to "scram" or speedily insert the control rod into the nuclear reactor to shut down the reactor. Such a scram is usually provided by disengaging the driving element from the leadscrew and allowing the leadscrew and the attached control rod to drop into the reactor. Thus, during a scram condition the leadscrew and control rod could be most easily ejected if a rupture were to occur in the housing. A similar condition exists when the reactor is shut down or anytime that the drive is disengaged from the leadscrew. Even when engagement of the leadscrew with the drive is provided, should a rupture occur which would subject the leadscrew to the full pressure of the reactor the engagement between the leadscrew and the drive could be broken or stripped and ejection may still occur.

SUMMARY OF THE INVENTION

In accordance with the present invention an anti-ejection system is provided which solves the mentioned problems associated with the prior art devices as well as providing other benefits.

The anti-ejection system of the present invention provides a latch member which engages the leadscrew and moves a predetermined distance with it in an ejection direction. A deformable member is located proximately to the latch member and is deformed by the movement of the latch member in the ejection direction to bind the leadscrew and prevent the ejection of the leadscrew from the housing.

In a specific embodiment of the present invention the latch member is formed as a pivotable pawl assembly which is engaged with a threaded portion of the leadscrew whenever the driving portion of the control rod drive is disconnected from the leadscrew. The pawl assembly will ratchet to allow the control rod to scram into the reactor and will not impair the control function of the control rod drive. However, the pawl assembly will catch the threads of the leadscrew and move with it if the leadscrew starts moving in an ejection direction. A deformable collet is positioned around the leadscrew and is deformed by the ejection direction movement of the pawl assembly to wedge the collet between the leadscrew and the control rod drive housing to thereby bind the leadscrew and prevent it from being ejected from the housing.

In view of the foregoing it will be understood that one aspect of the present invention is to provide an anti-ejection system which will engage the control rod drive but will not interfere with the normal control of the reactor by the control rod drive.

Another aspect of the present invention is to provide an anti-ejection system having a deformable member which will deform to bind the control rod drive only if an undesired ejection of the control rod is attempted.

These and other aspects of the present invention will become more apparent after a review of following description of the preferred embodiment when considered with the drawings.

DESCRIPTION OF THE PREFERRED EMBODIMENT

Figure 1:
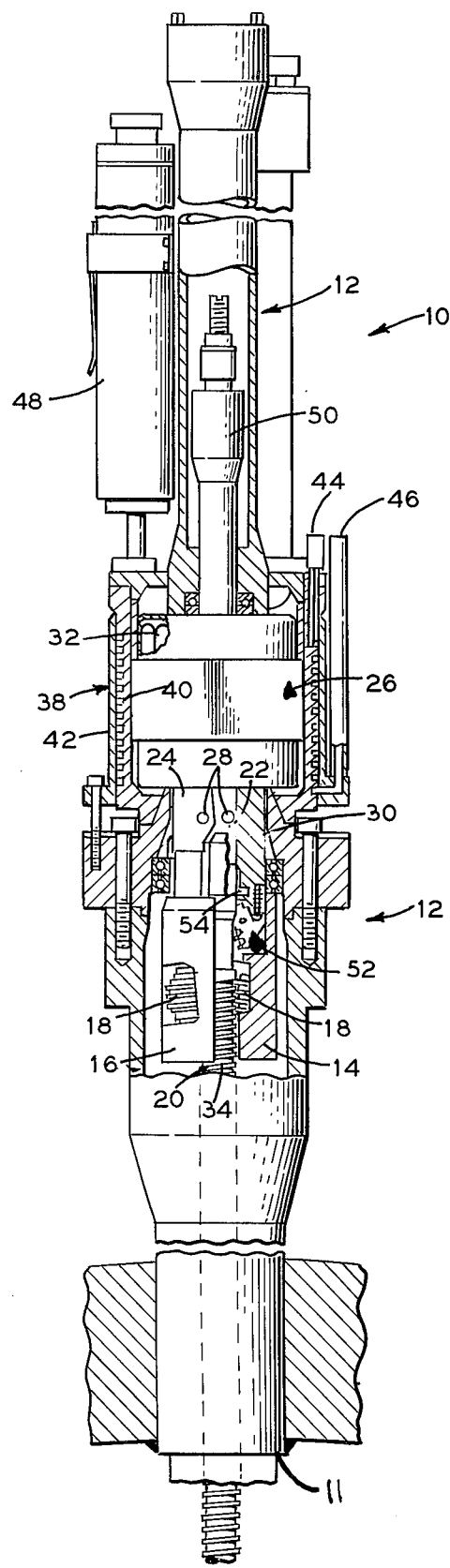
FIG. 1 is a cross sectional view of a control rod drive incorporating the anti-ejection system of the present invention.

Referring now to the drawings it will be understood that the showings therein are made for the purposes of describing a preferred embodiment of the invention and are not intended to limit the invention thereto.

FIG. 1 shows a control rod drive assembly 10 having a tubular housing 12 which is formed of a plurality of aligned sections welded together in sealed relation. The open end 11 of the housing 12 is adapted to be sealably secured, as by welding, in a standing position to a reactor vessel of a water-containing reactor to thereby seal the control rod drive 10 to the reactor vessel. The middle section of the housing 12 contains a pair of lever arms 14 and 16 each of which carries a roller nut 18 engageable with a leadscrew 20. Each roller nut 18 is swingable with its respective lever arms 14 and 16 into and out of meshing engagement with the axial screw shaft or leadscrew 20 to thereby control the positioning of the leadscrew 20. The leadscrew 20 extends downwardly through the open end 11 of the housing 12 and into the reactor vessel where it is coupled to a control rod (not shown) of the reactor in a manner known to those skilled in the art to thus allow the positioning of the leadscrew 20 to position the control rod.

The lever arms 14 and 16 which carry the roller nuts 18 are integral with arms 22 and 24 respectively which extend upwardly therefrom within a motor section 26 of the housing 12 and together with arms 14 and 16 define levers of the first class pivotable on pins 28 which are mounted in a rotor carrier body 30 of the housing 12. The arms 22 and 24 form segments of a rotor of an induction motor assembly, as is well known, so that when stator windings 32 are energized sequentially by a polyphase current, the rollers 18 are pivoted into engagement with the leadscrew 20 and cause the leadscrew 20 to move in a linear direction. More specifically, the rollers 18 planetate to linearly drive the non-rotating leadscrew 20 and the connected control rod. The leadscrew 20 is also supportable in a fixed stationary position by maintaining a non-rotating field current in the stator windings 32. This allows the rollers 18 to remain engaged with threads 34 of the leadscrew 20 but prevents the rollers 18 from planetating and driving the leadscrew 20. If the field in the stator 32 collapses, the rollers 18 are unmeshed from engagement with the leadscrew 20 by a biasing spring (not shown) and the leadscrew 20 and the control rod attached thereto are allowed to quickly drop into the reactor core under the force of gravity to shut down the reactor. This is usually referred to as a scram condition.

To eliminate sealing problems, the stator 32 is located externally of the motor section 26 of the housing 12 which section is usually formed of a material such as magnetic stainless steel or clad and plated carbon steel to enhance the magnetic coupling between the stator and the internally located segment arms 22 and 24. To dissipate the heat generated therein, the stator windings 32 are enclosed by a water jacket assembly 38 which has a metal sleeve 40 in which a helical peripheral water channel is formed on the outside surface. The convolutions of the water channel are enclosed by an external sleeve 42 and cooling fluid is conducted to and from the cooling assembly 38 through inlet and outlet connections 44 and 46.

As the leadscrew 20 is moved up and down into the reactor by the sequential energization of the stator windings 32 causing the engagement and planetation of the rollers 18 of the lever arms 22 and 24, the position of the leadscrew 20 is monitored by a position indicating assembly 48. The position indicating assembly 48 has a series of micro-switches (not shown) which are actuated by a permenent magnet (50) mounted on an upper extension of the leadscrew 20. The construction and operation of the foregoing is well known and a detailed explanation thereof may be found in U.S. Pat. No. 3,822,439.

It will be appreciated that the control rod drive housing 12 is pressurized to the pressure of the nuclear reactor by its sealed connection thereto through the open end 11 of the housing 12. Since the pressures in a nuclear reactor may be in the area of 2,000 psi, clearly a dangerous condition may exist should the housing 12 rupture. The leadscrew 20 would then be shot out of the housing 12 due to the pressure difference between the ambient and the housing 12. To prevent the leadscrew 20 from being ejected out of the housing 12 in such a rupture condition, an anti-ejection assembly 52 is located within the housing 12 in the area of the lever arms 14 and 16. This anti-ejection assembly 52 is made engageable with the threads 34 of the leadscrew 20 whenever the stator windings 32 are de-energized. Even when thusly engaged, the anti-ejection assembly 52 will allow the leadscrew 20 to ratchet with the assembly 52 to allow the leadscrew 20 to move in a scram direction. However, should the leadscrew 20 start moving in an opposite direction, indicating an attempted ejection, the anti-ejection assembly 52 will then move with the leadscrew 20 to press into and deform a collet 54 causing the collet 54 to wedge the leadscrew 20 to the inside wall of the housing 12 in the area of the rotor carrier body 30 to prevent the ejection of the leadscrew 20 from the housing 12.

Figure 2:
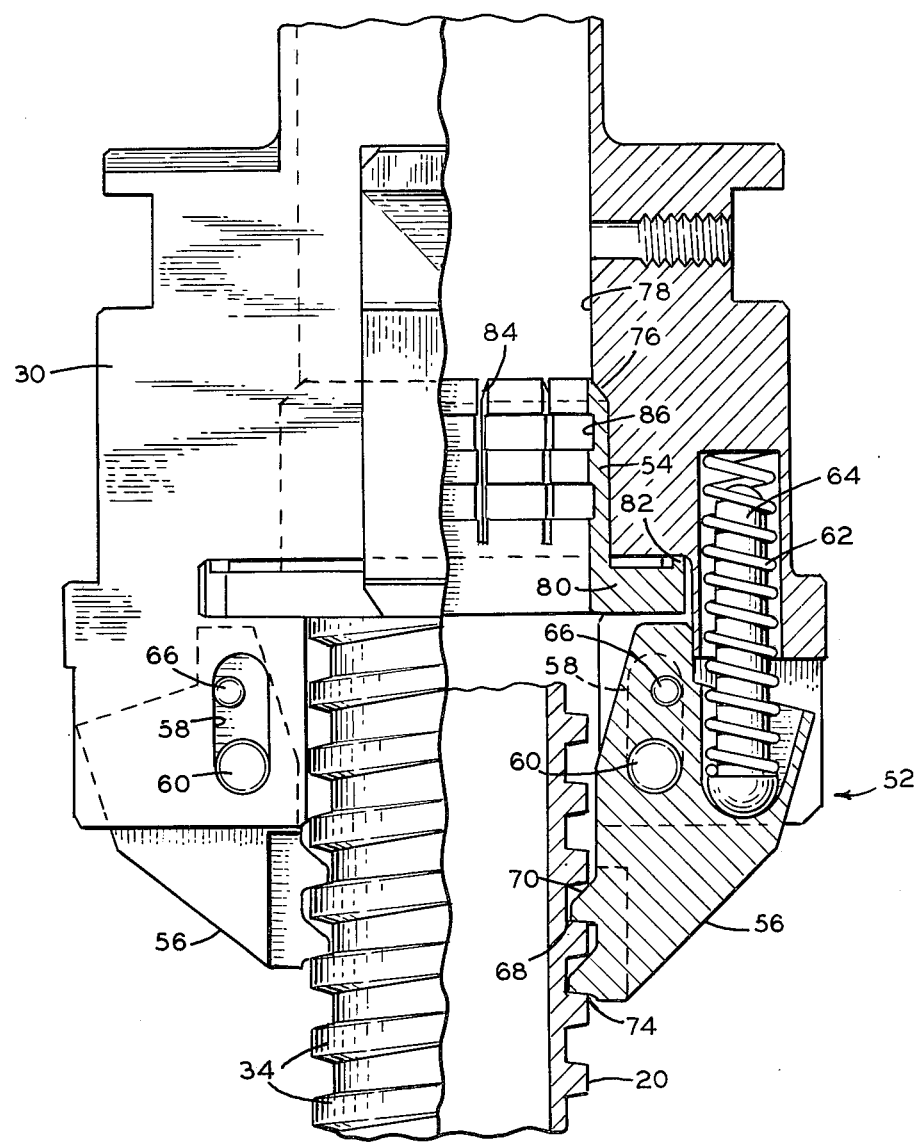
FIG. 2 is an enlarged view of the anti-ejection system of FIG. 1.

As may be best seen with reference to FIG. 2, the anti-ejection assembly 52 of the present invention includes a pair of substantially identical latch pawls 56 which are linearly movable a predetermined distance as allowed by slots 58 formed in the rotor carrier body 30. The latch pawls 56 are pivoted around pivots 60 located in respective slots 58 and formed with the latch pawls 56 to engage the threads 34 of the leadscrew 20 by the action of springs 62. The springs 62 are prevented from popping out of their mounting slots by guiding pins 64 centrally located within the springs 62. Each latch pawl 56 also has formed thereon a pin 66 which is engageable by respective lever arms 14 and 16 to pivot the latch pawls 56 against the force of the springs 62 and to thereby decouple the latch pawls 56 from their engaging position with the threads 34. Such engagement of the pins 66 by the lever arms 14 and 16 occurs whenever the field coil 32 is energized. Thus the anti-ejection assembly 52 does not interfere with the normal positioning control and hold functions of the control rod drive assembly 10.

When the stator coil 32 is de-energized the lever arms 14 and 16 release the pins 66 and the latch pawls 56 pivot around the points 60 under the force of the springs 62 to engage the threads 34. The latch pawls 56 have teeth 68 which have an inclined surface 70 to allow the latch pawls 56 to ratchet and thereby have the leadscrew 20 drop down into the reactor core in a scram condition. Each tooth 68 also has a flat surface 74 substantially parallel with the threads 34 to prevent the ratcheting of the latch pawls 56 in the opposite or ejection direction of the leadscrew 20. Therefore, should a rupture occur in the housing 12 the latch pawls 56 will move with the leadscrew 20 a predetermined distance as allowed by the clearance provided for the pivots 60 within the slots 58.

As the latch pawls 56 move up with the leadscrew 20, they engage the collet 54. If the rupture is a relatively small one which would prevent the full application of a pressure difference between ambient and the reactor vessel, the collet 54 may be strong enough to absorb the force provided thereto by the latch pawls 56. However, if the full pressure difference is applied to the leadscrew 20 by a complete rupture of the housing 12, the collet 54 would then be driven up along an inclined surface 76 of the rotor carrier body 30 to wedge the collet 54 into the path of the leadscrew 20 thereby wedging the leadscrew 20 to an inside wall 78 of the rotor carrier body 30. It will be understood that the collet 54 is larger in diameter than the leadscrew 20 in the undeformed condition to allow normal passage of the leadscrew 20 therethrough.

The collet 54 has a flange 80 which is recessed from the motor rotor carrier body 30 by means of a dimple 82. The dimple 82 acts as a pivot point for the collet 54 when it is being deformed. Thus the force of the latch pawls 56 driving up against the flange 80 causes the collet 54 to pivot around the point 82 and move linearly along the inclined surface 76. The collet 54 also has a series of vertical slots 84 extending substantially along the length thereof to allow the collet 54 to be easily deformed to a smaller diameter necessitated by its wedging action. The collet 54 also has a series of steps 86 substantially normal to the grooves or slots 84 which conform in width to the width of the threads 34 on the leadscrew 34 to allow a thread to be caught within the steps 86 when the leadscrew 20 moves against the wedged collet 54 to insure a more positive grasp of the threads 34 by the collet 54 thereby providing a more positive wedging action.

From the foregoing it will be seen that a positive anti-ejection system is provided which prevents the leadscrew 20 from being ejected out of the housing 12 during a scram condition or any other condition during which the leadscrew 20 of prior art devices was completely unretained by any type of hold-down or latching mechanism. During the times when the field coil 32 is energized the leadscrew 20 would be retained by the roller nuts 18 and ejection thereof would be prevented. However, should the roller nuts 18 not be strong enough to prevent the ejection of the leadscrew 20 during a field coil 32 energized condition, the end of the leadscrew 20 could be provided with a pop-out section such as a spring loaded pin (not shown) which would normally drag along the inside wall of the housing 12 but which would engage either the collet 54 or the latch pawls 56 should the end of the leadscrew be ejected beyond the roller nuts 18 in an ejection position.

Certain modifications and improvements will occur to those skilled in the art upon the reading of this specification. It will be understood that all such improvements and modifications, such as the end leadscrew mounted pin, have been deleted for the sake of conciseness and readability but are properly included within the scope of the present invention.

What I claim as new and desire to secure by Letters Patent of the United States is:

1. An anti-ejection system for a control rod drive assembly of a nuclear reactor comprising:
    a linearly movable control member driven by the control rod drive assembly for positioning a control rod in the nuclear reactor;
    latch means engageable with said control member to move with said control member whenever said control member moves in a first direction, said latch means remaining stationary when said control member moves in a second direction opposite said first direction; and
    deforming means for binding said control member to prevent further movement thereof in response to said latch means moving a predetermined distance in said first direction.

2. An anti-ejection system as set forth in claim 1 wherein said control member includes a threaded leadscrew linearly movable within a tubular pressure housing having an inclined surface area and wherein said deforming means includes a collet positioned proximate to the inclined surface area of the pressure housing to allow unhindered movement of said leadscrew so long as said latch means moves less than the predetermined distance in said first direction, said latch means moving said collet along the inclined surface of the pressure housing to wedge said collet between said leadscrew and the housing whenever said latch means moves beyond the predetermined distance in said first direction.

3. An anti-ejection system as set forth in claim 2 wherein said collet includes an elongated tubular portion positioned proximate to the inclined surface of the pressure housing and a collar portion formed substantially normal to said tubular portion for driving said tubular portion along the inclined surface to provide a wedge between said leadscrew and said pressure housing.

4. An anti-ejection system as set forth in claim 3 wherein said tubular portion of said collet is formed to include a series of elongated slots extending partially along the length of said tubular portion of said collet to ease the collapse of said tubular portion as the collet is wedged between said leadscrew and said pressure housing.

5. An anti-ejection system as set forth in claim 4 wherein said tubular portion of said collet is formed to include a series of grooves extending along the circumference of said tubular portion of said collet, said grooves being engageable with the threads of said leadscrew when the collet is wedged between said leadscrew and said pressure housing.

6. An anti-ejection system as set forth in claim 1 wherein said control member includes a threaded leadscrew and said latch means includes a pawl assembly pivotable to engage the threads of said leadscrew, said pawl assembly being movable said predetermined distance in response to movement of said leadscrew in said first direction to contact said deforming means.

7. An anti-ejection system as set forth in claim 6 wherein said pawl assembly includes a series of tooth members spaced to conform to the threads of said leadscrew, each tooth member having a sharp edge surface to allow said pawl assembly to move said predetermined distance with the movement of said leadscrew in said first direction, said tooth members also having an inclined surface to allow said pawl assembly to ratchet in response to movement of said leadscrew in a second direction opposite to said first direction.

8. An anti-ejection system as set forth in claim 7 including a pivotable leadscrew drive member having a first position wherein said leadscrew is disengaged and wherein said pawl assembly includes pin means actuated by said drive member to engage said tooth members of said pawl assembly with said leadscrew when said drive member is in said second position.

9. An anti-ejection system as set forth in claim 8 wherein said control member includes a threaded leadscrew linearly movable within a tubular pressure housing having an inclined surface area and said deforming means includes a collet positioned proximate to the inclined surface of the pressure housing to normally provide clearance for movement of said leadscrew so long as said latch means moves less than the predetermined distance in said first direction; said collet moving along the inclined surface of the pressure housing to bind said leadscrew whenever said latch means moves beyond the predetermined distance in said first direction.

10. An anti-ejection system as set forth in claim 9 wherein said collet includes an elongated tubular portion positioned proximate to the inclined surface of the pressure housing and includes a collar portion formed substantially normal to said tubular portion for driving said tubular portion along the inclined surface to provide a wedge between said leadscrew and said pressure housing.

11. A safety system for preventing the ejection of a movable control element from a sealed pressurized cylinder in the event of a rupture in the cylinder comprising:
    a pivotable latch member mounted to an internal wall of the cylinder to be linearly movable therealong, said latch member being also pivotable to a position engaging the control element to allow linear movement with the control element;
    a deformable wedge member mounted internally of the cylinder to be movable by a linear movement of said latch member to a position wedging the control element to prevent further movement of the control element; and means for controllably pivoting said latch member into engagement with the control element to allow linear movement with the control element.

12. A safety system as set forth in claim 11 including:

drive means for selectively engaging the control element to longitudinally position it within the cylinder; and said pivoting means engaging said latch member with the control element in response to said drive means disengaging the control element.

13. A safety system as set forth in claim 12 wherein said drive means includes a pivotable roller drive having a pivotable segment arm engageable with said latch member to pivot said latch member into engagement with the control element whenever said roller drive is disengaged from the control element.

* * * * *

UNITED STATES PATENT OFFICE
CERTIFICATE OF CORRECTION

PATENT NO. : 4,044,622
DATED : August 30, 1977
INVENTOR(S) : JOHN C. MATTHEWS

It is certified that error appears in the above—identified patent and that said Letters Patent are hereby corrected as shown below:

Abstract Page, left hand column, line 2, add

"Assignee: DIAMOND POWER SPECIALTY CORPORATION".

Column 3, line 36, change "permenent" to -- permanent --.

Signed and Sealed this

Third Day of January 1978

[SEAL]

Attest:

RUTH C. MASON
Attesting Officer

LUTRELLE F. PARKER
Acting Commissioner of Patents and Trademarks